Nov. 23, 1926.  1,608,340
J. F. SCHEIDY
CONVEYER CHAIN
Filed March 31, 1926
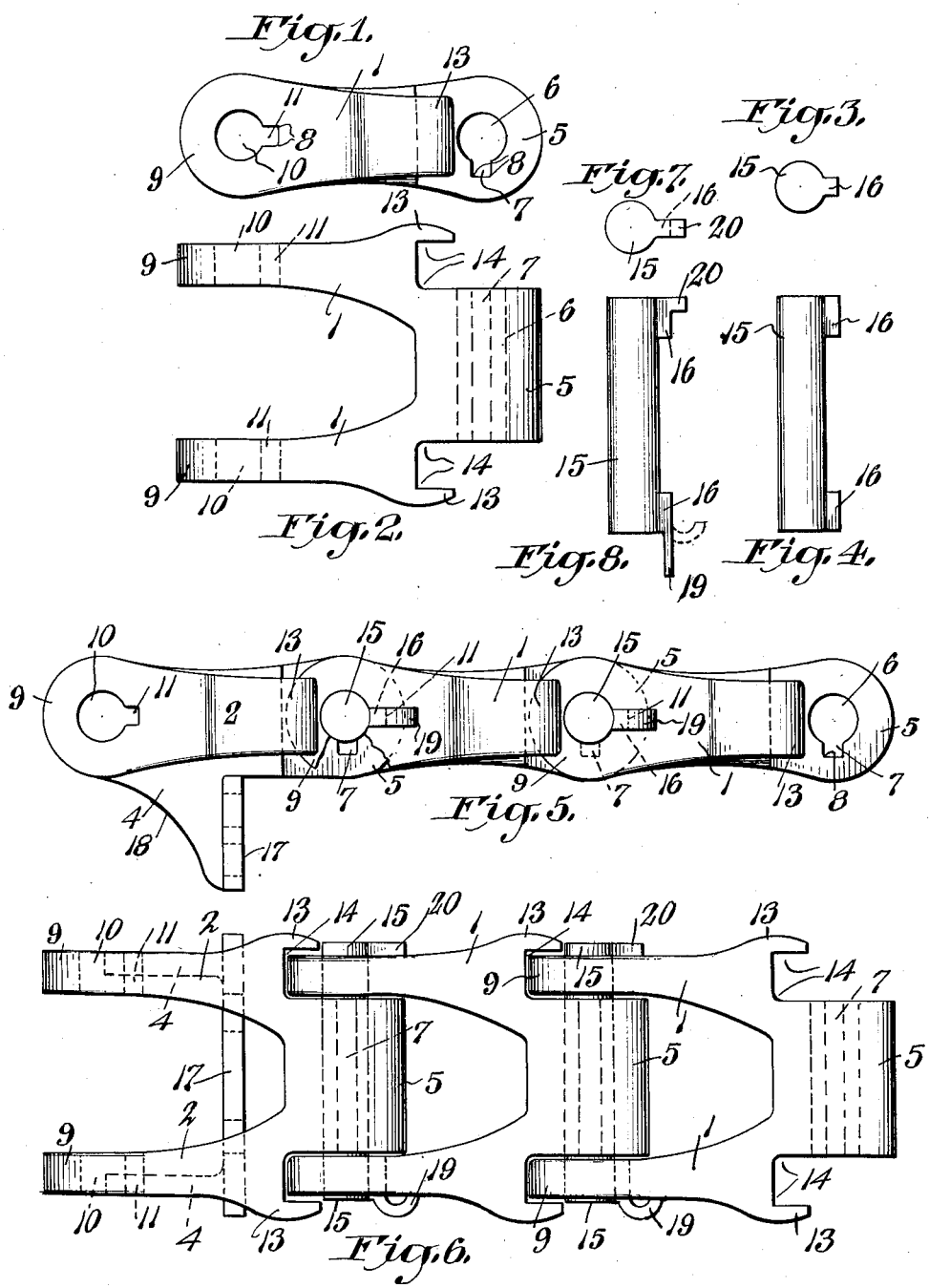
Inventor:
John F. Scheidy
by E. W. R. Ewing,
Atty.

Patented Nov. 23, 1926.

1,608,340

UNITED STATES PATENT OFFICE.

JOHN F. SCHEIDY, OF UPPER LEHIGH, PENNSYLVANIA.

CONVEYER CHAIN.

Application filed March 31, 1926. Serial No. 98,829.

The rough usage and conditions under which conveyer or link belt drive chains are worked render the usual form of such chains unsuitable in certain respects and my invention has been constructed to overcome such faults.

My invention relates to conveyer chains for use in mines or other difficult hauls and obviously such a chain should have few parts, be sturdy in construction, and capable of the easy removal of a broken pin or link with the quick substitution of a new one.

One object of my invention is to provide a conveyer chain comprising a succession of one-piece links and a key-pin, in other words but two members, thereby materially reducing wear and tear, with consequently less first cost, and also a much less repair cost to maintain the conveyer chain in workable condition.

Another object of my device is to provide a chain with the strength of the bar type chain, but with the advantage that a tooth of the drive sprocket can enter each link, thus making each pin carry its share of the load instead of every other pin carrying a heavier load.

Another object of my detachable device is to provide a durable, flexible chain having no rickety parts even after long usage, and one which runs smoothly over the sprocket without any jerking or bumping action.

A further object of my invention is to provide a top and bottom sided conveyer chain, connected with a key-pin, which key-pin means can not move sidewise when in operation, and said key-pin does not rotate thereby preventing unnecessary and excessive wear.

Another object of my invention is to provide a top and bottom-sided chain in which the pull passes directly through the groove in the prongs insuring greater strength at the weakest part of the link.

A still further object and a principal one is to provide a chain which if a break should occur and the chain pile up, the remaining links cannot become disconnected but will fall back past the right-angle registering position, and the key-pin will still lock the remaining links of the chain irrespective of the specially provided parts on the spline which prevent any possible accidental disengagement.

To effect these with quick assembling and disconnecting and other objects hereinafter mentioned, my invention includes certain novel features and combinations of specially formed and constructed parts, all of which will be more fully set forth hereinafter and illustrated in the accompanying drawing made a part hereof.

Figure 1 is a side view of a single link showing ho'es for key-pins with the bottom or outer side of the link facing down.

Fig. 2 is a top view of Fig. 1, showing the thickness of prongs and rounding of parts.

Fig. 3 is an end view of one form of key-pin.

Fig. 4 is a longitudinal view of key-pin in Fig. 3, showing splines on either end.

Fig. 5 is a side view of the assembled chain with portion of middle link broken away, and shows the end link with a flight attachment integral therewith on the bottom side thereof.

Fig. 6 is a top view of Fig. 5 showing clearance between prongs and lugs and how the specially provided parts on the splines overlap the prongs.

Fig. 7 is an end view of preferred form of key-pin with special flange on one spline and a special extended portion on the other spline.

Fig. 8 is a side view of the preferred form of key-pin.

Like reference figures refer to the same parts in all the views.

Referring to Figs. 1 and 2, solid link 1 with bottom or outer side down is illustrated, whereas in Fig. 5, link 2 is shown similar to link 1 but is provided with flight attachment 4 integral therewith. Solid links 1 and 2, Figs. 1, 2, 5 and 6 are provided with similar tubular connecting collars or ends 5 through each of which is provided a hole at 6, the lower portion thereof being further provided with a square-shaped groove at 7, which grooves are provided with rounded corners at 8. Said groove 7 is placed at right angles to the direction of the pull on collar 5. Groove 7 is on the bottom portion of links 1 and 2, being placed differently than a similar shaped groove found on both prongs. The other ends of solid links 1 and 2, Figs. 1 and 5 are provided with two prongs 9, each prong being pierced with holes at 10, exactly in the center of each prong, and are further provided with a groove at 11, which is horizontal with the prong and whose center line is in the line of pull thus increasing the area which will be in tension and where it has its greatest effect.

Integral with each prong 9 of links 1 and 2, and on the outer edge thereof is constructed a lug or flange portion 13 of sufficient width and thickness to provide for any strain which may occur should some hard substance become wedged in any link, causing a tendency to spread the prongs 9 when the tooth of the sprocket wheel enters that link. It will be noted however that there is some clearance between the inner surface of lugs 13 and outer side of prongs 9, as well as between the inner side of prongs 9 and ends of collar 5. In case of a spread in one direction the inner side of prong 9 will rub against the end surface of collar 5 effectively stopping the spread with the combined co-action of lugs 13 against the opposite prong 9 and spline 16 of key-pin 15. It will be noted that grooves 7 and 11 while at right angles with respect to each other are both otherwise constructed in a similar manner with rounded corners because if pointed or even fully squared corners were provided the link would be more liable to break first at these points, which is done away with by appropriately rounding the corners of grooves 7 and 11.

Reference is now made to the two squared shoulders or recesses 14 provided on links 1 and 2, formed by the outer surfaces of collar 5 and inner surface of lugs 13 into which prongs 9 of the adjacent link are placed very loosely. Attention is invited to Fig. 6 which illustrates the amount of this clearance both at the ends of prongs 9 as well as on both sides of said prongs. The only difference between the bottom or outer side of link 1 is that groove 7 is placed downwardly, the top or inner side is provided only with hole 6 on collar 5. Links 1 and 2 are different only in that link 2 is provided with flight attachment 4 on the bottom or outer side thereof, and as the chain goes over the sprocket it will be noticed that the angle of the spline increases.

The other necessary part of my invention is the specially devised key or pin 15, hereinafter referred to as key-pin 15, illustrated by Figs. 3, 4, 7 and 8, end and side views respectively. A simple form of key-pin 15 is illustrated by Figs. 3 and 4. Integral with this key-pin 15 are provided two splines 16 on either end of key-pin 15 as illustrated best in Fig. 4. This key-pin with splines fits snugly into and through hole 10 and groove 11 provided on each prong 9, and also through hole 6 and groove 7 provided on collar 5. Key-pin 15 can only be inserted when an adjacent link is placed at right angles downwardly to another link, in which position rounded grooves 7 and 11 register with each other and thus form a continuous key-way or channel through both prongs 9 and collar 5. In this position key-pin 15 may be easily inserted manually in this key-way or disengaged manually as the case may be. It will be especially noted that if the links are placed at right angles upwardly, i. e. the link at the right end of Fig. 5 be raised upwardly, that it is impossible to insert or disengage key-pin 15 in that or in fact any other angle or position except at right angles downwardly. This is important as it will be seen that when the top side of the chain is passing over a sprocket wheel the angle increases thus assuring the impossibility of key-pin 15, Figs. 3 and 4, becoming disengaged. This is true of link 2 as well as link 1. Link 2, Figs. 5 and 6, is similar to link 1 with this modification. It is provided with flight attachment 4 integral therewith and it has a straight flat face 17 and a curved back portion 18 to give a sturdy yet not too heavy construction. Fig. 5 best illustrates this flight attachment 4, and shows clearly which is the bottom or outer side of the chain and which is the top or inner side thereof as it is in actual operation. When the chain is in this operating position, it is seen that the spline 16 on key-pin 15 is in a snug position in grooves 11 and at right angles with respect to groove 7 in collar 5, best shown by the broken away portion on Fig. 5. The key-pin 15 with splines automatically locks the collar 5 and prongs 9 at the least turn from the right angled position. If the chain is used too long without replacing a worn pin or link and a break should occur and the chain pile up, links 1 and 2 will fall back past the right angled registering position, so key-pin 15 cannot become disconnected. Grooves 11 in prongs 9 will have passed groove 7 in collar 5, and so would not register, and splines 16 on key-pin 15 will hold the collapsed links in a securely locked position. The chain can then be stretched and the broken link or key-pin replaced. It takes a manual pressure to remove any key-pin 15 even in a registering position.

The preferred form of key-pin is shown in Figs. 7 and 8, which is provided with specially designed extended portions on each spline 16. Spline 16 on upper end of Fig. 8 of key-pin 15 is provided with a small flange or prong 20, which when inserted through prongs 9 and collar 5, extends over a portion of upper prong 9, Fig. 6. The lower end of spline 16 at the other end of key-pin 15 is provided with an extended portion 19 capable of being hammered or bent into a curved position as shown on lower prongs 9, Fig. 6, and in dotted lines, Fig. 8. These two special devices effectually prevent any possible accidental disengagement of key-pin 15 even when in registered position. A further use is found in that they assist in preventing spreading of the prongs.

It will be noted that there are no ribs to insure strength to the prongs or arms 9, and no unnecessary kinks in the same, which are found on some chains in order to give the desired spread and which in practice and use have been found to give a pull in a broken line.

The pull on my device in the larger chains is very nearly in a straight line.

To assemble the links to form a chain, collar 5 of one link must be at right angles with the prongs 9 of another link. Holding prongs 9 with bottom side down and collar 5 to the right, take another link and insert the prongs thereof into recesses 14 with the bottom side downwardly and then bring it to a right angled position downwardly until the grooves register, which is at the right angled position. In this position insert key-pin 15 and upon the link assuming a staightened position it is secured or locked by splines 16, which operate against respective ends of collar 5. It is noted that key-pin 15 retains a fixed position with respect to prongs 9, although collar 5 freely rotates on it.

Special attention is invited to the fact that my device consists really of but two parts, i. e. link 1 (or modified link 2), and key-pin 15, both of simple sturdy construction.

Changes may be made in the form, size and arrangement of the several parts set forth without departing from the scope or spirit of my invention.

I am aware that overlapping lugs engaging with the ends of prongs to prevent them from spreading have been invented, hence do not claim them broadly. I am also aware that a pin with somewhat similar splines thereon has been invented, but not with the extended portions hereinabove described, so I do not claim it broadly. The improvements described and illustrated above in combination with the said known parts of this two pieced device are believed to be novel and produce a new and useful conveyer chain possessing exceptional merit.

What I claim as new is—

1. A circular key-pin capable of insertion in fitted holes of links of a conveyer chain, said key-pin being provided with similar splines on the same side thereof near each end of said key-pin, one spline being further provided with a small overlapping flange and the other spline being provided with an extended portion capable of being bent over the outer side of a prong of one of the said links to prevent accidental disengagement, as and for the purpose described.

2. In a conveyer chain, the combination of a sucession of solid one-piece top and bottom-sided links, each link consisting of two prongs, each prong being provided with a key-hole and a collar piece intregal with and connecting said prongs, said collar piece being provided with a similar key-hole but placed at right angles with respect to first mentioned key-hole, and a plurality of key-pins, each key-pin consisting of a circular pin piece with similar splines on the same side and at ends thereof, one spline being further provided with a small overlapping flange which in operating position overlaps one of the said prongs, the other spline being provided with an extended portion capable in operating use of being bent over the other of said prongs thus insuring against accidental disengagement, both splines being incapable of rotation with respect to said prongs but permitting free rotation of said collars, and also capable of insertion or removal only when adjacent links are at right angles when said holes and grooves form a continuous key-way, and operating to automatically lock said prongs and collar in any other position.

3. In a conveyer chain in combination a succession of one-piece links, each link consisting of two prongs, each prong being provided with a key-way, and a collar portion integral with and connecting said prongs, said collar piece being also provided with a similar key-way but placed at right angles with respect to first mentioned key-ways, lugs extending from each prong and integral therewith, and a plurality of key-pins, each key-pin consisting of a circular pin piece with similar splines on same side and at the ends of said pin, one spline being further provided with a small overlapping flange which when inserted in the key-way of a prong overlaps a portion thereof, the other spline being provided with an extended portion which when inserted in operating position would extend beyond the other prong, but as it is capable of being bent, in such bent position overlaps a portion of the other prong, said flange portion and said bent portion coacting with said splines to prevent spreading of said prongs and any accidental disengagement of said prongs and collar, substantially as and for the purpose described.

In testimony whereof I have hereunto set my signature.

JOHN F. SCHEIDY.